United States Patent [19]

Aarts et al.

[11] 4,395,745
[45] Jul. 26, 1983

[54] HEAD-DRUM MOUNTING FOR A HELICAL SCAN TAPE RECORDER

[75] Inventors: Petrus J. J. Aarts, Eindhoven, Netherlands; Harald Fleck; Karl Kocsisek, both of Vienna, Austria; Ernst M. Schmidt, Eindhoven, Netherlands

[73] Assignee: U.S. Philips Corporation, New York, N.Y.

[21] Appl. No.: 180,779

[22] Filed: Aug. 25, 1980

[30] Foreign Application Priority Data

Aug. 29, 1979 [NL] Netherlands ......................... 7906478

[51] Int. Cl.³ .............................................. G11B 5/10
[52] U.S. Cl. .................................... 360/129; 360/104; 360/130.24
[58] Field of Search ................ 360/129, 104, 107, 86, 360/130.24; 403/373, 374, 290, 334; 292/256.6; 24/16; 64/30 E, 30 D, 27 NM; 411/909, 360

[56] References Cited

U.S. PATENT DOCUMENTS

| 101,824 | 4/1870 | Clark | 403/374 |
|---|---|---|---|
| 2,168,469 | 8/1939 | Brouwer | 403/374 X |
| 3,021,049 | 2/1962 | Settle | 403/374 X |
| 3,075,049 | 1/1963 | Gordon et al. | 360/84 |
| 3,165,342 | 1/1965 | Anderson | 403/374 |
| 3,567,869 | 3/1971 | Hirota et al. | 360/107 |
| 3,995,317 | 11/1976 | Schmidt | 360/130.24 X |
| 4,080,639 | 3/1978 | Gunschmann | 360/107 |
| 4,321,639 | 3/1982 | Aarts | 360/104 |

FOREIGN PATENT DOCUMENTS 345577 9/1978 Austria ................................ 360/129

Primary Examiner—John H. Wolff
Attorney, Agent, or Firm—David R. Treacy

[57] ABSTRACT

The head-drum rotary system of a helical scan video recorder is centered on the drive spindle without tilting, by elastic deformation of two wall portions which serve as centering devices. At least one of the centering devices may also function as a clamping element for holding the head-drum system on the spindle.

17 Claims, 19 Drawing Figures

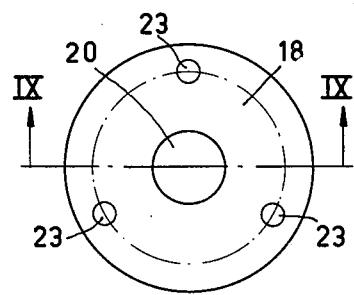 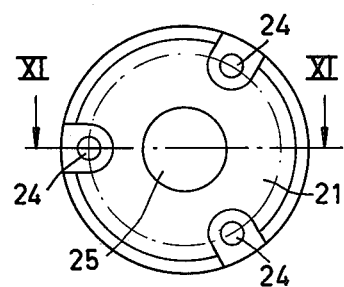
FIG.8   FIG.10
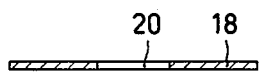 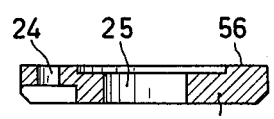
FIG.9   FIG.11
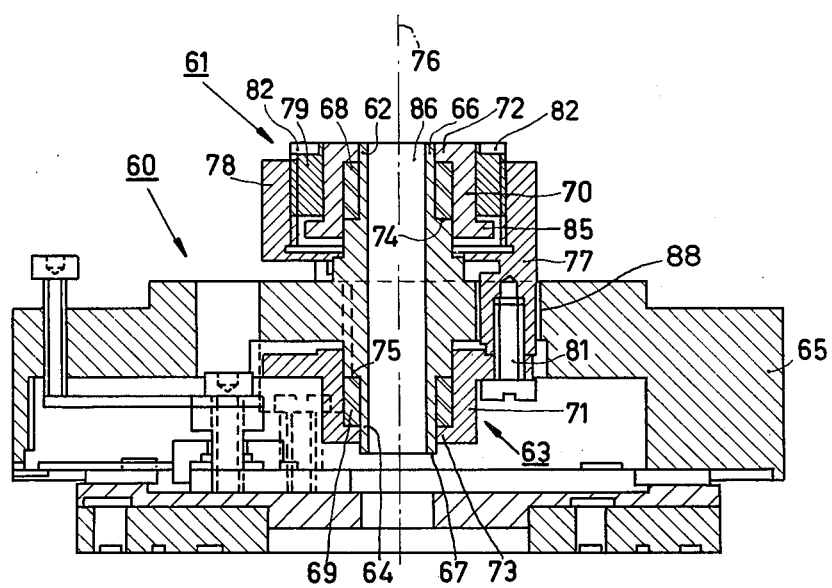
FIG.12

HEAD-DRUM MOUNTING FOR A HELICAL SCAN TAPE RECORDER

BACKGROUND OF THE INVENTION

The invention relates to an apparatus for magnetically recording and reading wide-band signals on a magnetic tape in signal tracks which extend obliquely of the tape adjacent each other; and more particularly, to such recorders having: an at least partly cylindrical drive spindle with a free end, which spindle is rotatable about an axis of rotation; at least one magnetic head which is rotatable in a circular path about an axis of rotation for recording and/or reading the oblique signal tracks on the magnetic tape; a head-drum system, which is detachably secured to a cylindrical portion of the drive spindle near its free end, and which has a first side which is situated adjacent said free end and a second side which is remote from said free end, which head-drum system carries the magnetic heads and is formed with a central bore for mounting the head-drum system on the drive spindle; and a centering device on the first side of the head-drum system for centering the head drum system on the drive spindle and comprising an elastically deformable wall portion on the first side of the head drum system, which wall portion cooperates with the drive spindle.

Such apparatus for magnetically recording and reading video signals, for a so-called helical-scan video recorder, is known from Austrian patent specification AT-PS 345577. In this known apparatus the head-drum system comprises a cylindrical head-drum which constitutes the rotary part of a drum unit for guiding the magnetic tape past the magnetic heads in a helical path, and a stationary drum which is coaxial with the rotary drum and is spaced therefrom by a narrow gap. On the stationary drum a helical guide edge for the magnetic tape is provided, extending over part of its circumference. As a result of its rotation the rotary head-drum locally produces a film of air between the magnetic tape and the drum unit. Thus, the friction between the magnetic tape and the drum unit is reduced. On its first side which is remote from the stationary drum the head-drum is provided with a clamping sleeve with a cylindrical outer surface, which constitutes the elastically deformable wall portion. Around this clamping sleeve a clamping ring is mounted, which is formed with a slot in its ring wall, so that the parts of the clamping ring which are spaced by the slot can be moved resiliently towards each other. On the one side of the slot a threaded bolt is fitted into the clamping ring and extends with clearance through the clamping ring on the other side of the slot. By tightening the bolt the clamping ring is deformed, so that the clamping sleeve of the head drum is also deformed and the head drum is centered and also clamped on the driving spindle.

In video recorders and in particular in cassette recorders intended for home-entertainment use a most economic use of the magnetic tape is pursued and therefore it is attempted to provide the magnetic tape with as dense a pattern of adjacent signal tracks as possible. Modern helical-scan video cassette recorders may employ slightly overlapping signal tracks having a width of approximately 40 microns and having a center-to-center spacing of the tracks of approximately 30 microns. The track length is approximately 100 mm. The tracks should be situated within narrow tolerances over the entire length, in particular because great value is attached to the possibility of playing back on one video recorder video programs recorded with another similar video recorder, without an appreciable loss of quality. A really successful interchangeability of cassettes provided with recorded programs and video recorders belonging to a standard system for recording/reproducing video signals is obtained only if a program recorded on one video cassette recorder can be played back on another video cassette recorder belonging to the same video-recording system without a perceptible loss of quality of the signal reproduced. This requirement is referred to as the compatibility of video recorders and the associated magnetic tape cassettes, which together belong to a standard system for recording and reproducing video signals. As a result of this only very small tolerance ranges are available for the position of the magnetic heads relative to the stationary tape-guide edge. In helical-scan video cassette recorders equipped with a plurality of magnetic heads such as video cassette recorders adapted for domestic use, it is essential that the heads are also accurately positioned relative to each other in view of the synchronism of the video signals which are recorded or head by the heads. Also in this case only small tolerance ranges are available because otherwise visible time tolerance ranges must be guaranteed. Yet it is desirable that these centering and mounting operations can be carried out by a service engineer rapidly and without the use of special alignment devices.

The central bore of this known head-drum has a certain length. The diameter of the bore is slightly greater than the diameter of the drive spindle. Owing to the small radial clearance which exists between the drive spindle and the wall of the central bore, the head-drum can readily be slid over the drive spindle. After the head-drum system has been slid onto the spindle it is secured to the drive spindle with the aid of the clamping device, the clearance between the wall of the central bore and the drive-spindle being locally eliminated at the location of the clamping device by the elastic deformation of the clamping sleeve. During clamping a certain tilting of the head-drum system relative to its axis of rotation is inevitable. Due to the clamping forces which are exerted, the clearance between the drive spindle and the wall of the bore on the second side of the head-drum system is eliminated completely on one side of 5 microns, in such a way that the mutual difference in height between the magnetic heads which should not exceed 5 microns. For a head-drum system with a rotary head-drum having a diameter of 65 mm and carrying two magnetic heads the eccentricity of the magnetic heads relative to the axis of rotation of the head drum in a typical modern video cassette recorder should be less than 1½ micron. A further requirement which is imposed is that the magnetic heads are uniformly spaced over the circumference of the head-drum system in an accurate manner. For example, when two magnetic heads are used, the lengths of arc between the two magnetic heads should not differ more than 3 microns from each other.

The construction of the head-drum system should be such that mounting and also removing the head drum system during the manufacture of video cassette recorders, and for any subsequent servicing operations, can be effected rapidly and by the use of simple means. It is then a requirement that after removal of a head-drum system and the subsequent mounting of a new head-drum system, for example for servicing purposes, the desired compatibility is still quaranteed. In view of the very small tolerances which are permissible in respect of the eccentricity and the height position of the magnetic heads, the precise centering and the precise coaxial mounting of the head-drum system within these errors will appear in the reproduced video picture, i.e. instabilities will occur near the edge of the picture.

In view of the stringent accuracy requirements imposed on the positions of the magnetic heads use is generally made of special optical precision instruments for mounting the magnetic heads on the head-drum system. In the case of the head-drum systems for apparatus of the previously mentioned known type the head-drum system is intended to be first centered and mounted on a special mounting spindle with the aid of its own clamping device. After mounting and alignment of the magnetic heads the head-drum system is removed from the mounting spindle by releasing the clamping device, after which the head-drum system may be mounted on the drive spindle of a video cassette recorder. Obviously it is then essential that the adjustments performed with the aid of said mounting spindle are most accurately reproduced after the head-drum system has been mounted on the drive spindle of the video cassette recorder. In a modern helical scan video cassette recorder the height tolerance of the magnetic heads relative to the tape-guide edge should be adjusted with a tolerance of the order of magnitude of the bore. This tilting is undesirable because it contributes to the eccentricity of the magnetic heads and to errors in respect of the position of the magnetic heads relative to the supporting edge. The location where the drive spindle makes contact with the bore on the second side of the head-drum system is unpredictable and not reproducible. It is therefore highly probable that the direction of the tilting to which the head-drum system is subject during mounting of the said special mounting spindle will thus be different from the direction of the tilting to which the head-drum system is subject during mounting on the drive spindle of the video cassette recorder.

SUMMARY OF THE INVENTION

It is the object of the invention to provide an apparatus for magnetically recording and reading wide band signals, such as a helical scan tape recorder, which makes it possible to obtain a greater reproducibility of the original alignment of the at least one magnetic head on the mounting spindle when the head-drum system is mounted on the drive spindle of a video recorder. To this end the invention is characterized in that the apparatus comprises two centering devices spaced axially from one another in order to center the head-drum system on the drive spindle on both sides; that is, a first centering device on the first side of the head drum system as well as a second centering device on the second side of the head-drum system; a first elastically deformable wall portion which cooperates with the drive spindle, and forms part of the centering device on the first side of the head-drum system and a second elastically deformable wall portion which cooperates with the drive spindle and forms part of the centering device on the second side of the head-drum system. By the use of two centering devices of this construction on both sides of the head-drum system, a head-drum system is obtained with a reduced tilt relative to its axis of rotation.

One preferred embodiment of the invention is characterized in that the first centering device is a clamping device for detachably clamping and thereby centering the head-drum system on the drive spindle; that the clamping device comprises the first elastically deformable wall portion of the first centering device, which portion cooperates with the drive spindle, and a wall-deforming device which cooperates with the first deformable wall portion, which wall-deforming device exerts pressure forces on the first deformable wall portion and thereby elastically deforms said wall portion and centers as well as clamps it on the drive spindle; that the second elastically deformable wall portion on the second side of the head-drum system comprises a centering diaphragm made of a thin elastic sheet material, which diaphragm is formed with a central opening for fitting tightly on the drive spindle, the opening having a shape and dimensions such that when the head-drum system is mounted on the drive spindle portions of the centering diaphragm adjacent the central opening are subjected to an elastic deflection in an axial direction as a result of the forces obtaining between the centering diaphragm and the drive spindle; and that fixing means for fixing the centering diaphragm cooperate with the centering diaphragm at some distance from the central opening, so that the portions of the centering diaphragm situated between the location where the fixing means cooperate with the centering diaphragm and the central opening are free to a limited extent to be subjected to the elastic deflection. The use of a centering diaphragm for centering a head drum has been proposed previously by one of the Applicants herein in his non-published U.S. Patent Application Ser. No. 115,171 filed Jan. 25, 1980, now U.S. Pat. No. 4,321,639 (hereby incorporated by reference). This embodiment may preferably be characterized in that the first deformable wall portion comprises an elastically deformable clamping sleeve which is concentric with the drive spindle, which sleeve has a free end and an outer circumferential surface and that the wall deforming device comprises a clamping-sleeve deforming device which exerts pressure forces on the outer circumferential surface of the clamping sleeve. In this embodiment the clamping device on the first side of the head drum may for example comprise the clamping device which is known per se from the previously mentioned Austrian patent specification AT-PS 345,577. However, it is advantageous to employ an embodiment which is characterized in that the clamping-sleeve deforming device comprises a clamping ring which is deformable between a released position and a clamping position, which ring has an uninterrupted structure in the circumferential direction and by symmetrical radial deformation locally exerts a clamping pressure on the clamping sleeve, which pressure is distributed substantially uniformly over the circumference; that the clamping ring has a conical inner wall with a surface which forms part of the generated surface of an imaginary cone with an axis and with an apex angle between the generatrix of the generated surface and the axis; that the clamping ring through cooperation with a part of the outer circumferential surface of the clamping sleeve is expanded from the released position to the clamping position by an axial movement over the clamping sleeve; and that the apex angle is smaller than the friction angle of the materials used for the clamping sleeve and the clamping ring, so that the frictional forces prevailing between the clamping sleeve and the clamping ring will prevent the clamping ring from being moved back to the released position in an axial direction as a result of the axial components of the clamping forces exerted on it in the clamping position. The friction angle of two materials is defined as the of the quotient of friction force and normal force between frictionally engaging surfaces, one of the surfaces being of one material and the other surface being of the other material, under conditions of slow relative movement of the two surfaces. The clamping device on the first side of the head drum employed in this embodiment has already been proposed by three of the applicants herein in their non-published U.S. Patent Application Ser. No. 144,730 filed Apr. 28, 1980 (hereby incorporated by reference).

The clamping sleeve may be externally provided with a shoulder, which is concentric with the axis of rotation of the drive spindle, for cooperation with the conical inner wall of the clamping ring, so that the clamping sleeve is deformed by the clamping ring at a location which is accurately defined by the shoulder. The head-drum system may be provided with a collar, which is coaxial with the clamping sleeve, for taking up reaction forces exerted on the head-drum system by auxiliary tools which serve for axially moving the clamping ring over the clamping sleeve.

A second preferred embodiment of the invention is characterized in that the first centering device is a clamping device for detachably clamping and thereby also centering the head drum system on the drive spindle, that the first clamping device comprises the first elastically deformable wall portion of the first centering device, which wall portion cooperates with the drive spindle, and a first wall-deforming device which cooperates with the first deformable wall portion, which wall-deforming device exerts pressure forces on the first deformable wall portion and thus elastically deforms said wall portion and centers as well as clamps it on the deive spindle; that on the second side of the head-drum system the second centering device is a second clamping device for detachably clamping and thereby centering the head-drum system on the drive spindle; that the second clamping device comprises the second elastically deformable wall portion of the second centring device, which portion cooperates with the drive spindle, and a second wall-deforming device which cooperates with the second deformable wall portion, which wall-deforming device exerts pressure forces on the second deformable wall portion and thus elastically deforms said wall portion and centers as well as clamps it on the drive spindle. In this kind of embodiment two clamping devices a are provided for clamping the head-drum system on the drive spindle, so that each of the clamping devices need only provide half the total clamping force required. As in a video recorder the second side of the head-drum system is situated at a very small distance from the stationary drum, in a further preferred embodiment the head-drum system has at least one opening which extends from the first side to the second side of the head-drum system, and at least one component which which passes through the opening to bring the second clamping device from the released position into the clamping position from the first side of the head-drum system and vice versa, thus precluding assembly problems.

A third preferred embodiment of the invention is characterized in that the first and second elastically deformable wall portions comprise first and second cylindrical clamping sleeves respectively which fit concentrically around cylindrical portions of the drive spindle, each sleeve having a free end; and that the first and the second wall-deforming devices comprise first and second clamping rings respectively which fit concentrically around the first and the second clamping sleeve respectively and under the influence of axial compression are radially deformable between a released and a clamping position; first and second pressure elements arranged concentrically around the first and the second clamping sleeves respectively, leaving annular spaces for the first and the second clamping rings respectively; first and second axially movable clamping-ring compressors, which cooperate with the first and the second clamping rings respectively for axially compressing the clamping rings; first and second clamping-ring stops at some axial distance from the free ends of the first and the second clamping sleeves respectively; and displacement means which cooperate with the clamping-ring compressors for moving the clamping-ring compressors in directions towards the clamping ring stops for thereby axially compressing the clamping rings between their released positions and their clamping positions in the annular spaces between the clamping sleeves and the pressure elements and for thus elastically deforming the clamping sleeves in the radial direction and thereby clamping and centering said clamping sleeves and thus the head-drum system on the drive spindle. This embodiment is in fact a dual version of a head-disc clamping device as already proposed in the previous Netherlands Application No. 79 03 626 to which U.S. patent application Ser. No. 144,730 corresponds. In a preferred aspect of this embodiment the displacement means comprise three pulling members which pass through equally spaced openings in the head-drum and transmit pulling forces between the two clamping-ring compressors, and screw-threaded means for pulling the two clamping-ring compressors towards each other, inter alia with the aid of the pulling members which extend through the openings.

Another embodiment of the invention, employing two clamping devices on both sides of the head drum is characterized in that the head drum system is provided on its first side and its second side with at least one first conical cavity and at least one second conical cavity respectively, connected to each other by an opening each cavity having an inner wall which forms part of a cone whose base faces the first and second side respectively of the head-drum system, said first and second elastically deformable wall portions comprising wall portions which are situated between the central bore of the head-drum system and the first and the second conical cavities respectively; that the first and the second wall-deforming devices comprise first and second clamping plugs, provided with outer walls which cooperate with the inner walls of the conical cavities; that the dislacement means comprises a draw-bolt with a screw-thread, which draw-bolt extends through the opening from the first side of the head-drum system to the second side, one of said two clamping plugs constituting the head of the draw-bolt and the associated other clamping plug constituting a nut which is fitted on the draw-bolt.

Yet another embodiment of the invention is characterized in that the first and the second deformable wall portions comprise a first and a second elastically deformable clamping sleeve respectively which is concentric with the drive spindle and which has a free end and a circumferential surface; that the first and the second wall-deforming devices comprise a first and a second clamping ring respectively which is deformable between a released position and a clamping position, which ring has an uninterrupted structure in the circumferential direction and through symmetrical radial deformation locally exerts a clamping pressure on the associated clamping sleeve, which is distributed substantially uniformly over the circumference; that each of the clamping rings has a conical inner wall with a surface which forms part of the generated surface of an imaginary cone, having an axis and having an apex angle between the generatrix of the generated surface and the axis; that through axial movements in opposite directions over the associated clamping sleeves the clamping rings, by cooperation with the outer circumferential surfaces of the clamping sleeves are expanded from their released positions to their clamping positions, and that the apex angle is smaller than the friction angle of the materials used for the clamping sleeves and the clamping rings, so that the frictional forces prevailing between the clamping sleeves and the clamping rings will prevent the clamping rings from being moved back to the released positions in an axial direction as a result of the axial components of the clamping forces exerted on them in the clamping positions.

The invention will now be described in more detail with reference to the drawings, which show schematically some embodiments of the invention.

BRIEF DESCRIPTION OF THE DRAWINGS

FIG. 8 is a plan view of the diaphragm used in the head-drum system of FIG. 3, FIG. 9 shows the diaphragm of FIG. 8, in a cross-section taken on the line IX—IX in FIG. 8, FIG. 10 is a plan view of a pressure member used for mounting the diaphragm of FIG. 8, FIG. 11 shows the pressure member of FIG. 10 in a cross-section taken on the line XI—XI in FIG. 10, FIG. 12 is a cross-section of a head-drum mounting arrangement in accordance with a second embodiment of the invention.

DESCRIPTION OF THE PREFERRED EMBODIMENTS

Figure 1:
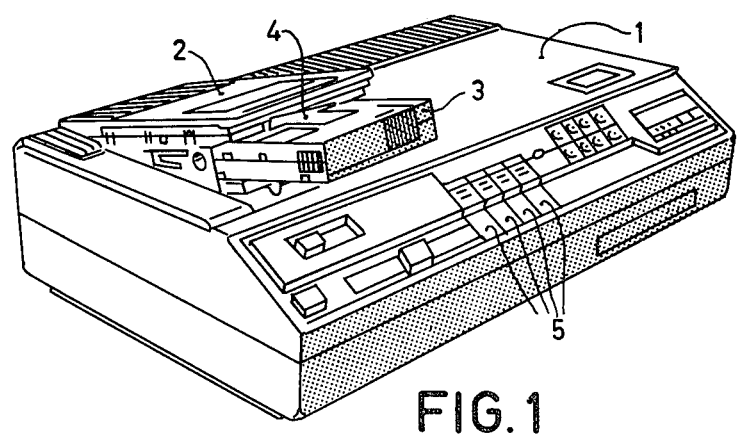
FIG. 1 is a perspective view of a helical-scan video tape recorder in which the invention may be used, having a cassette holder which can accommodate a magnetic-tape cassette, the cassette holder being shown in the open position.

FIG. 1 shows a helical-scan video recorder of a conventional type and suitable for magnetically recording and reading video signals in interrupted signal tracks which extend obliquely adjacent each other on a magnetic tape. A cassette holder 2 is pivotably journalled on the housing 1 of the video cassette recorder. A magnetic-tape cassette 3 can be inserted into the cassette holder in the direction of an arrow 4. When the cassette has been inserted completely, the cassette holder can be swung down, the cassette thereby being brought into its operating position in which the magnetic tape can be withdrawn from the cassette with the aid of means provided for this purpose in the video cassette recorder, which means ultimately bring the magnetic tape into contact with the magnetic heads. The usual controls, such as for example a number of control buttons 5, are located on the housing 1, FIG. 2 shows a part of the video cassette recorder of FIG. 1 on a slightly enlarged scale, but now with the cassette holder 2 removed, so that at least a part of the interior is visible.

Figure 2:
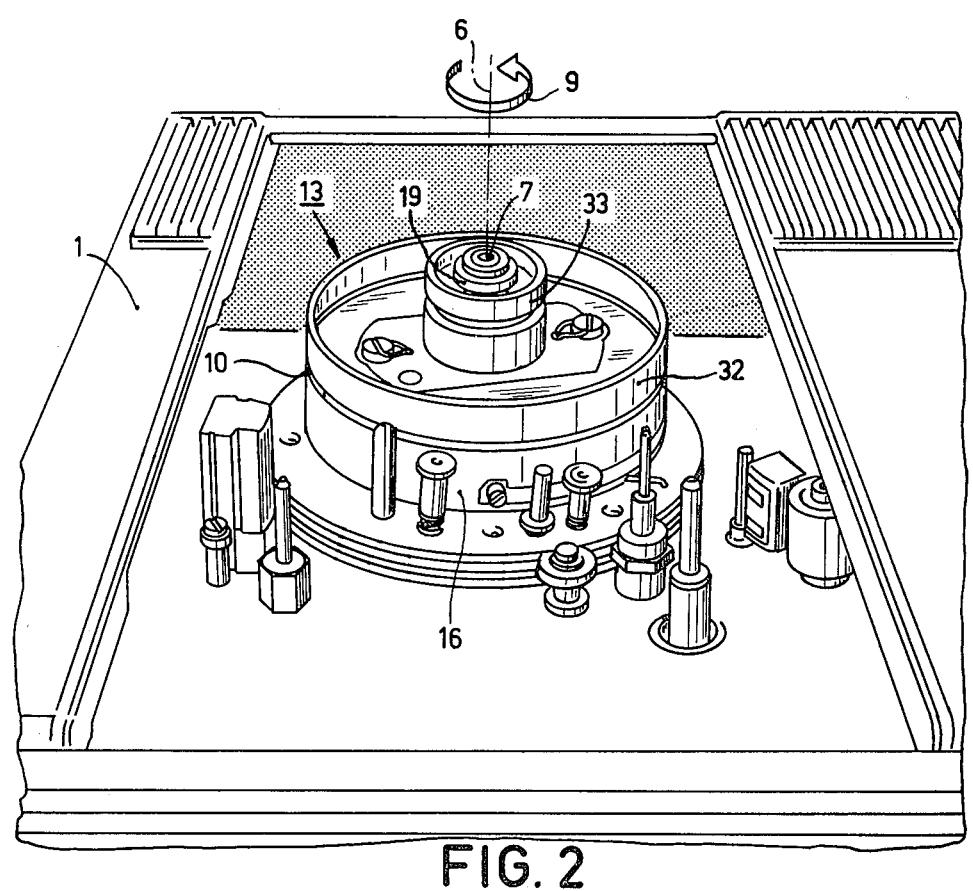
FIG. 2 is a different perspective view, on a slightly enlarged scale and from a different angle, of a part of the video cassette recorder of FIG. 1, the cassette holder being removed.
Figure 3:
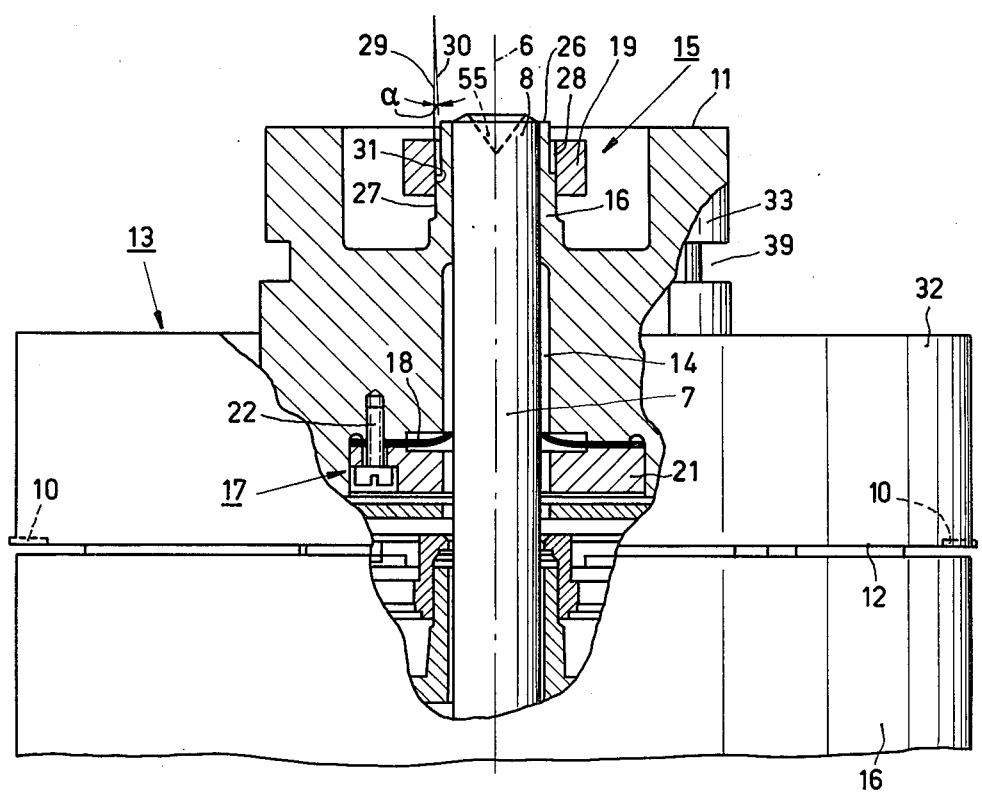
FIG. 3 is a side view, partly in cross-section and on an enlarged scale, of a drum unit for the video cassette recorder of FIGS. 1 and 2, in which the lower centering device of the head-drum is a diaphragm.
Figure 4:
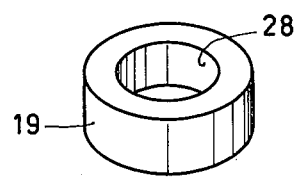
FIG. 4 is a perspective view of a clamping ring, used in the head-drum system of FIG. 3, for centering and clamping the head-drum system on a drive spindle of the video cassette recorder.

The drum unit of the video cassette recorder of FIGS. 1 and 2, as shown in FIG. 3, has an at least partly cylindrical drive spindle 7 with a free end 8, rotatable about an axis of rotation 6. The direction of rotation of the drive spindle is indicated with an arrow 9 in FIG. 2. Two magnetic heads 10 are rotatable in a circular path about the axis of rotation 6, which heads serve for recording and reading signal tracks on the magnetic tape. FIG. 2 shows only one magnetic head 10, both magnetic heads being shown in FIG. 3. The magnetic tape itself as well as the oblique signal tracks written thereon are generally known per se and are not shown and are not essential for a correct understanding of the invention. On the drive spindle 7, near its free end 8, is mounted a head-drum system 13 having a first side 11 which is situated adjacent the free end of the drive spindle, and a second side 12 which is remote from the free end of the spindle. This head-drum system comprises the two magnetic heads 10 and is formed with a central bore 14 for mounting the head-drum system on the drive spindle 7. For centering the head-drum system on the drive spindle, a centering device 15 having an elastically deformable wall portion 16 is located on the first side 11.

At some axial distance from the centering device 15 a second centering device 17 is located near the second side 12 of the head-drum system 13. This second centering device comprises a second elastically deformable wall portion 18, which cooperates with the drive spindle in a similar way to the first wall portion 16 of the first centering device.

The centering device 15 on the first side 11 of the head-drum system 13 functions as a detachably clamping device with a centering action and may thus be regarded as a combined clamping device and centering device for the head-drum system 13 on the drive spindle 7. The device 15 includes a first elastically deformable wall portion 16 and a wall-deforming device 19, which fits over and exerts pressure forces on the first deformable wall portion 16. As a result of this, the wall portion is elastically deformed and centered as well as clamped on the drive spindle 7. The second elastically deformable wall portion 18 on the second side 12 of the head-drum system is formed by a centering diaphragm of a thin elastic sheet material with a central opening 20, shown in FIGS. 8 and 9. The drive spindle 7 is fitted tightly into the central opening 20, which has a shape and dimensions such that, when the head drum system 13 is mounted on the drive spindle 7, portions of the centering diaphragm 18 adjacent the central opening 20 are subjected to an elastic deflection in an axial direction as a result of the forces between the centering diaphragm and the drive spindle. The centering diaphragm 18 is secured with the aid of a fixing means, preferably formed by a pressure member or thrust ring 21 (see also FIGS. 10 and 11) and three bolts 22 which are passed through openings 23 in the centering diaphragm 18 and through openings 24 in the thrust ring 21, and are screwed into the head drum 32. The thrust ring has a central bore 25, through which the drive spindle 7 passes with clearance. The fixing means ring 21 is relieved for some distance from the central opening 20 in the diaphragm 18, so that the portions of the centering diaphragm situated between the location where the fixing means 21 engages the centring diaphragm and the central opening 20 are free to a limited extent to allow the elastic deflection.

The first deformable wall portion 16 is formed as an elastically deformable clamping sleeve with a free end 26 and with an outer circumferential stepped surface 27, which is concentric with the drive spindle 7. The wall-deforming device 19, which exerts pressure forces on the outer circumferential surface 27, is a clamping ring 19 which is radially deformable between a released position and a clamping position. The ring has an uninterrupted structure in the circumferential direction and through a symmetrical radial deformation exerts a clamping pressure on the clamping sleeve 16, which pressure is substantially uniformly distributed over the circumference. The clamping ring has a conical inner wall 28 with a surface which forms part of the generated surface of an imaginary cone, whose axis is constituted by the axis of rotation 6 of the drive spindle 7. The apex angle $\alpha$ of the cone is indicated in FIG. 3 between the generatrix 29 of the imaginary cone and an auxiliary line 30 parallel to the axis of rotation 6. Through axial displacement over the clamping sleeve 16 the clamping ring 19, by cooperation with a shoulder 31 on the outer circumferential surface 27 of the clamping sleeve, is expanded from its released position to the clamping position.

The angle $\alpha$ is smaller than the friction angle $\phi$ of the materials used for for the clamping sleeve 16 and the clamping ring 19 so that the frictional forces occurring between the clamping sleeve and the clamping ring will prevent the clamping ring from moving in an axial direction as a result of the axial components of the clamping force exerted on it in the clamping position. In order obtain a satisfactory clamping pressure and for a sufficiently accurate centering it is of importance that the clearance between the drive spindle 7 and the clamping sleeve 16, when the clamping ring is still in its released position, does not exceed approximately 15 $\mu$m and is preferably even smaller. In the case of a drive spindle diameter of 6 mm it is for example possible to employ a fit which is designated h5/H6 in the I.S.O. system of fits. In accordance with the standard fit the drive spindle may be undersized to a maximum of 5 $\mu$m and the bore in the head drum may be oversized to a maximum of 8 $\mu$m. When an aluminum head drum 32 is used in combination with a brass clamping ring 19 the angle $\alpha$ may for example be 1°30'.

Provision of a shoulder 31 in the stepped circumferential surface 27, for cooperation with the conical inner wall 28 of the clamping ring 19, enables deformation of the clamping sleeve 16 at a location which is accurately defined.

Figure 5:
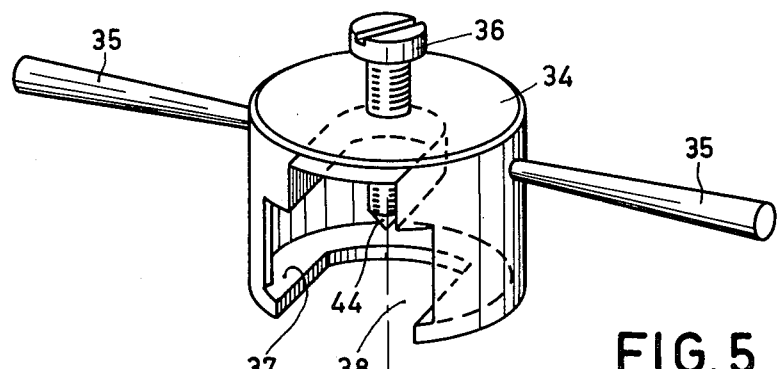
FIGS. 5 and 6 are perspective views showing parts of a simple tool for mounting the clamping ring of FIG. 4.
Figure 6:
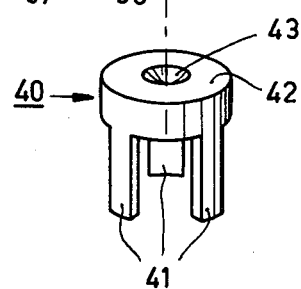

Mounting and removing the clamping ring 19 on and from the clamping sleeve 16 can be effected with a fairly simple hand tool. FIGS. 5 and 6 show tools for mounting the clamping ring. The head drum 32 is provided with a collar 33 which is coaxial with the clamping sleeve 16 for taking up reaction forces exerted on the head-drum system by these tools. FIG. 5 shows a cup 34 on diametrically opposed sides of which two pins 35 are secured. A screw 36 is threaded through the center of the base of the cup, so it can be tightened or loosened in an axial direction. At the bottom the sleeve has a flange 37 with a substantially U-shaped recess 38. This recess is dimensioned so that the cup 34 can be slid around the collar 33 of the head disc, the flange 37 fitting in a circumferential groove 39 at the underside of the collar. Before the sleeve 34 is slid into the head drum and the clamping ring 19 is fitted onto the clamping sleeve 16 and a thrust member 40 (see FIG. 6) is placed on the clamping ring 19. The thrust member is provided with three axially extending limbs 41 which bear on the upper surface of the clamping ring 19 around the clamping sleeve 16. In the upper surface 42 of the thrust member 40 a conical cavity 43 is formed for receiving a conical end 44 of the thrust screw 36. The clamping ring 19 is urged to its clamping position by tightening the screw 36, the conical end 44 of the screw being centered in the conical cavity 43 and pressing on the thrust member 40. The two pins 35 on the sleeve 34 may be held manually in order to prevent the sleeve from rotating from the screw 36 is tightened. The axial reaction forces of the auxiliary tool are transmitted to the collar 33 of the head drum 32 by the flange 37.

Figure 7:
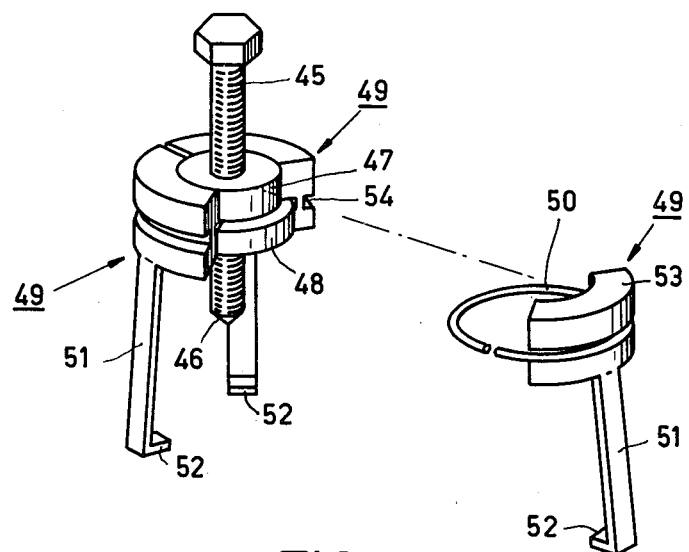
FIG. 7 is a partly exploded perspective view of a simple tool for removing the clamping ring of FIG. 4.
Figure 13:
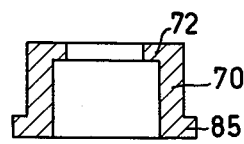
FIG. 13 is a cross-sectional detailed view of a clamping ring compressor forming part of the head-drum system of FIG. 12.
Figure 14:
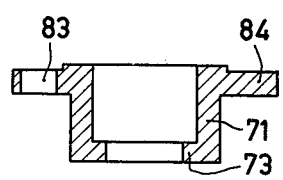
FIG. 14 is a cross-sectional detailed view of the other clamping ring compressor forming part of the head-drum system of FIG. 12.

For removing the clamping ring the pulling tool of FIG. 7 can be used. This tool includes a screw 45 with a conical end 46, a threaded ring 47 with a flange 48, three pivotal extraction members 49 and a resilient wire ring 50. The extraction members 49 each have an extraction limb 51 with a finger 52, connected to an upper portion 53 having an external surface that may be cylindrical and which is formed with a groove 54 for the wire ring 50. The upper portion 53 of each extraction member 49 bears axially on the flange 48 and is resiliently urged against the outside of the ring 47 by the wire ring 50. The extraction members 49 are mounted on the ring 47 so as to be slightly movable in a manner such that the extraction limbs 51 can be pivoted slightly outwards, i.e. at least so far that the feet 52 can be fitted over the clamping ring 19. The conical end 47 of the screw 45 is fitted into a conical cavity 55 in the free end 8 of the drive spindle 7. When the threaded bolt 45 is tightened the feet 52 are moved upwards until they engage the underside of the clamping ring 19. Further tightening of the threaded bolt results in the clamping ring being released. The axial reaction force of this tool is directly transmitted to the drive spindle 7.

The centering diaphragm 18 of FIGS. 8 and 9 has a thickness of approximately 0.1 mm and is made of a chromium-nickel (18 Cr-8 Ni) spring steel. The outer diameter of the centering diaphragm is approximately 20 mm, and the three openings 23 for the passage of the bolts 22 are situated on a pitch circle of approximately 16 mm. The openings 23 correspond to similar openings 24, in the thrust ring 21. The central opening 20 of the centering diaphragm 18 has a diameter of approximately 6 mm, while the inner diameter of an annular thrust surface 56 of the thrust ring 21 is approximately 12 mm. The distance between the edge off the central opening 20 of the centering diaphragm 18 and the thrust surface 56 of the thrust ring 21 is consequently 3 mm. The degree of deflection of the portion of the centering diaphragm situated between the centering opening 20 and the thrust surface 56 is shown highly exaggerated in FIG. 3. In reality the axial deflection is not more than approximately 0.2 mm. When a centering diaphragm in accordance with FIGS. 8 and 9 is used, i.e. when it is formed with a round opening 10 and has a thickness of approximately 0.1 mm, a force of approximately 1000 g is required for fitting the head-drum system 13 onto the drive spindle 7. For removing the head-drum system it is found that a smaller force suffices. This is due to the manner of deformation of the centering diaphragm 18 which during removal of the head-drum system is subject to buckling, which demands a smaller force than the deflection when the system is mounted.

The head-drum system 60 of FIG. 12 is provided with a first clamping device 61 on its first side, which clamping device serves for detachably clamping and centering the head-drum system 60 on a drive spindle, not shown, which first clamping device thus also functions as the first centering device. The first clamping device 61 comprises a first elastically deformable wall portion 62 for cooperation with the drive spindle. On this deformable wall portion pressure forces are exerted by a wall-deforming device to be described in more detail hereinafter, so that the wall portion is elastically deformed and is thus centered and clamped onto the drive spindle. A second clamping device 63 on the other side of the head-drum system 60 detachably clamps and centers the head-drum system on the drive spindle, so that the second clamping device also functions as the second centering device. The second clamping device 63 has a second elastically deformable wall portion 64 and a wall-deforming device, to be described in more detail hereinafter, which exerts pressure forces on the wall portion 64, which is thereby elastically deformed and thus centers as well as clamps the head-drum system on the drive spindle.

The first and second elastically deformable wall portions 62 and 64 are formed by cylindrical clamping sleeves extending from the drum 65 and having free ends 66 and 67, which fit concentrically around cylindrical portions of the drive spindle. The first and the second wall-deforming devices respectively comprise first and second clamping rings 68 and 69, which fit concentrically around the clamping sleeves 62 and 64 respectively and which are radially deformable between a released position and a clamping position under the influence of axial forces. A first pressure element or cup 70 and a second pressure element or cup 71 are concentrically arranged around the clamping sleeves 62 and 64 respectively, leaving annular spaces for the clamping rings 68 and 69 respectively. In this embodiment first and second clamping-ring compressors 72 and 73 respectively engage the first and second clamping rings 68 and 69 for axially compressing said rings. Preferably these compressors are formed by inwardly directed flanges which are the bases of the cups 70 and 71 respectively. In principle is is also possible to employ separate components for this purpose. At its first side the head drum 65 is provided with a shoulder 74 spaced from the free end 66 of the first clamping sleeve 62, which shoulder constitutes a stop for the clamping ring 68. On the other side corresponding shoulder 75 forms a stop for the clamping ring 69. Cooperating with the clamping ring compressors 72 and 73 are displacement means for moving the clamping-ring compressors in directions towards the clamping-ring shoulder stops 74 and 75 respectively. As a result of this the clamping ring 68 and 69 are moved by axial compression between their released positions and their clamping positions in the annular spaces surrounding the clamping sleeves 62 and 64 respectively and are thus elastically deformed in a radial direction. In this way the clamping sleeves 62 and 64, and thus the head-drum system 60, are clamped and centered on the drive spindle.

Figure 16:
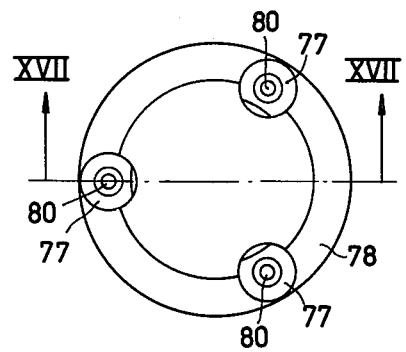
FIG. 16 is a plan view of a part of the head-drum system of FIG. 12, showing the threaded sleeve and three legs which transmit pulling forces between the two clamping ring compressors shown in FIGS. 13 and 14 respectively.
Figure 15:
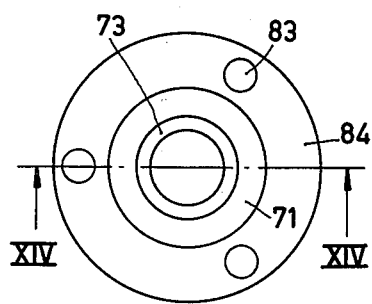
FIG. 15 is a plan view of the ring compressor of FIG. 14.
Figure 17:
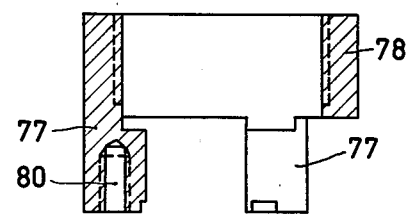
FIG. 17 is a cross-section taken on the line XVII—XVII in FIG. 16.

To enable easy operation of a displacement means for the second compressor 73, the head drum 65 has three openings 66 situated at equal distances from the axis of rotation of the head-drum system 60 at equal angular distances from each other. The displacement means for moving the clamping-ring compressors 72 and 73 towards each other comprise (see FIGS. 16 and 17) three members or legs 77 which pass through the openings 66 to transmit the pulling forces between the two clamping-ring compressors. To displace the compressors an externally threaded bushing 79 is screwed into an internally threaded sleeve 78 which is integral with the legs 77 at the drum first side. The other end of each leg 77 has a threaded bore 80 for a bolt 81. The three bolts 81 extend through openings 83 in an outwardly directed flange 84 which is formed on the cup 71. The pressure bush 70 is provided with a smaller outer flange 85, arranged within the sleeve 78 for engagement by the bushing 79.

The assembly is mounted as shown in FIG. 12. A central bore 86 of the head-drum system 60 has a diameter which is slightly greater than the diameter of the drive spindle on which the head drum system is to be mounted. With respect to the adaptation of the two diameters to each other, the same rules apply as discussed previously with reference to the embodiment of FIG. 3. After the head-drum system 60 has been placed on a drive spindle, the threaded bushing 79 is turned with the aid of a suitable tool, for example by engaging slots 82, so that at a given instant the bottom of this busing will come into contact with the flange 85 of the pressure cup 70. When the bushing 79 is further rotated the pressure cup 71 is moved axially via the leg member 77 through a distance such that at a given instant the clamping-ring compressor 73 makes contact with the clamping ring 69. Both clamping-ring compressors 72 and 73 are now in contact with the clamping rings 68 and 69 respectively. A further rotation of the threaded bushing 79 now results in the clamping-ring compressors 72 and 73 being pulled towards each other, so that the clamping rings 68 and 69 are axially compressed in the closed annular spaces in which they are located and thus expand radially and exert pressure on the clamping sleeves 62 and 64. As a result of this the sleeves 62 and 64 are subjected to a radial deformation which is substantially uniformly distributed over the circumference and thereby center as well as clamp the head-drum system 60 on the drive spindle on the first side and on the second side. When the threaded bushing 79 is loosened, the clamping rings 68 and 69 return from the clamping position to the released position under the influence of their own elasticity. In this respect it is of advantage if the clamping rings as they expand axially meet with a minimal resistance as a result of the friction occurring between their inner walls and the outer walls of the clamping sleeves. It is therefore preferred that the clamping rings are manufactured from a self-lubricating material such as, for example, polytetrafluorethylene.

Figure 18:
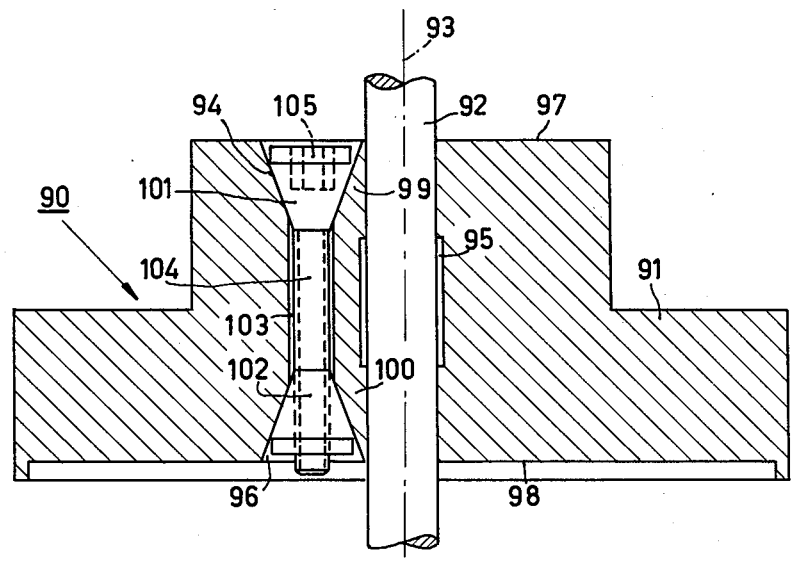
FIG. 18 is a very schematic cross-section illustrating the principle of a head drum for an apparatus in accordance with yet another embodiment of the invention.

The head-drum system 90, which is only shown schematically in FIG. 18, comprises a head drum 91 which is mounted on a drive spindle 92 which is rotatable about an axis of rotation 93. On the first side 97 the head drum is formed with a conical cavity 94 at some distance from the central bore 95 of the head drum 91. On the other side 98 a similar conical cavity 96 is formed, coaxial with the cavity 94. These conical cavities have inner walls which each form part of a cone whose base faces the first and the second side respectively of the head-drum system. The first and the second elastically deformable wall portions 99 and 100 are situated between the central bore 95 of the head-drum system and the first and the second conical cavities 94 and 96 respectively. A first and a second wall-deforming device comprise a first and a second clamping plug 101 and 102 respectively, having outer walls which cooperate with the walls of the conical cavities 94 and 96. Displacement means cooperate with the first clamping plug 94 for moving that plug in a direction towards the second side 98 of the head-drum system, and with the second clamping plug 96 for moving this plug in a direction towards the first side 97 of the head-drum system. In the head drum 91 an opening 103 is formed which extends from the first side 97 to the second side 98 of the head drum. This opening accommodates displacement means in the form of a draw-bolt 104. The first clamping plug 101 constitutes the head of the draw-bolt 104 and the second clamping plug 102 constitutes a nut fitted on the draw-bolt. The clamping plug 101 is formed with a cavity 105 of hexagonal cross-section in which an Allen wrench can engage for tightening the draw-bolt 103. During this tightening the clamping plugs 102 and 101 are drawn towards each other, so that pressure forces are exerted on the elastic wall portions 99 and 100, as a result of which these portions are deformed elastically and the head-drum system is centered and at the same time clamped on the drive spindle 92. Obviously, it is possible to employ more wall-deforming devices in the form of clamping plugs which are regularly spaced around the drive spindle 92.

Figure 19:
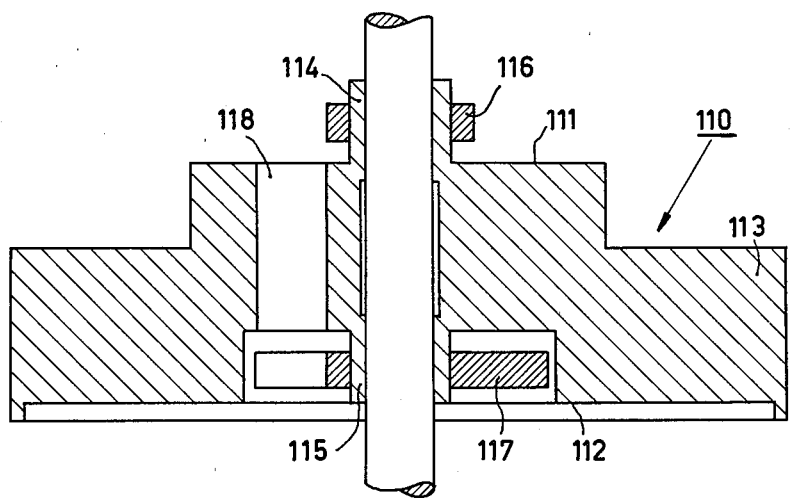
FIG. 19 is a very schematic cross-section illustrating the principle of a head drum for yet another embodiment of the invention.

The head-drum system 110 of FIG. 19 closely resembles the head-drum system 13 of FIG. 3, except that now elastically deformable clamping sleeves 114 and 115, having conical outer surfaces, have been provided on both the first side 111 and on the second side 112 of the head drum 113. Furthermore there are now provided two clamping rings 116 and 117, which are movable over the conical outer surfaces of the clamping sleeves 114 and 115 between a released position and a clamping position. In order to enable the second clamping ring 117 on the second side 112 of the head drum 113 to be moved from the first side 111, a few, for example, three, openings 118 are formed in the head drum. By means of auxiliary tools, which in principle need not differ much from those shown in FIGS. 5 through 7, the clamping ring 116, and via the openings 118 also the clamping ring 117, can be moved between their released positions and their clamping positions and vice versa.

What is claimed is:

1. An apparatus for magnetically recording and reading wide-band signals on a magnetic tape in signal tracks which extend obliquely on the tape adjacent each other, comprising:
   (a) an at least partly cylindrical drive spindle having a free end, rotatable about an axis of rotation,
   (b) a head-drum system detachably secured to a cylindrical portion of the drive spindle near its free end, having a first side adjacent said free end, a second side remote from said free end, a central bore for mounting the head-drum system on the drive spindle, and comprising at least one magnetic head rotatable in a circular path about said axis of rotation, and
   (c) a first centering device on the first side of the head-drum system, comprising a first electrically deformable wall portion on the first side of the head-drum system, which wall portion engages the drive spindle for centering the head-drum system, characterized in that
   the head-drum system further comprises a second centering device spaced axially from the first centering device, said second centering device comprising a second elastically deformable wall portion which engages the drive spindle and is disposed on the second side of the head-drum system.

2. An apparatus as claimed in claim 1, characterized in that the first centering device is a clamping device for detachably clamping the head-drum system on the drive spindle, comprising a wall-deforming device which engages said first deformable wall portion to elastically deform said wall portion and clamp and center it on the drive spindle,
   the second elastically deformable wall portion comprises a centering diaphragm of thin elastic sheet material having a central opening having a shape and dimensions such that when the head-drum system is fitted on the drive spindle, portions of the centering diaphragm adjacent the central opening are subjected to an elastic deflection in an axially direction, and
   the apparatus further comprising fixing means for mounting said diaphragm to the head-drum, so arranged that portions of the centering diaphragm disposed between the central opening and the location of engagement by said fixing means are free so as to permit said elastic deflection.

3. An apparatus as claimed in claim 2, wherein said first deformable wall portion is an elastically deformable clamping sleeve arranged concentric with the drive spindle, having a free end and an outer circumferential surface, and
   the wall-deforming device comprises a clamping sleeve deforming device which exerts radial pressure forces on said circumferential surface.

4. An apparatus as claimed in claim 3, wherein said clamping-sleeve deforming device comprises a clamping ring having an uninterrupted structure in the circumferential direction, and deformable between a released position and a clamping position, and a conical inner wall having an apex angle selected such that friction force between the clamping sleeve and the clamping ring prevents movement of the clamping ring to the released position as a result of axial components of the clamping forces exerted on it when in the clamping position.

5. An apparatus as claimed in claim 4, wherein said clamping sleeve has an external shoulder disposed for engagement by said conical inner wall, whereby the clamping sleeve is deformed at an accurately defined location.

6. An apparatus as claimed in claim 4, wherein the head-drum includes a collar coaxial with the clamping sleeve, for engagement by tools used in axially moving the clamping ring over the clamping sleeve.

7. An apparatus as claimed in claim 1, characterized in that the first centering device is a first clamping device comprising a first wall-deforming device for engagement with said first deformable wall portion for elastically deforming said wall portion and clamping and centering the head-drum on the spindle, and the second centering device is a second clamping device for detachably clamping and thereby centering the head-drum system on the spindle, comprising said second elastically deformable wall portion of the head-drum and a second wall-deforming device which engages said second wall portion to elastically deform said portion and center as well as clamp it on the drive spindle.

8. An apparatus as claimed in claim 5, characterized in that said elastically deformable wall portions are cylindrical clamping sleeves, each having a free end, said wall-deforming devices each comprise a clamping ring fitting concentrically around the respective clamping sleeve, formed from a material which deforms radially when compressed axially, and the head-drum system further comprises first and second pressure elements arranged concentrically around said first and second clamping sleeves, defining annular spaces for the first and second clamping rings respectively, first and second axially movable clamping-ring compressors arranged to engage respective end faces of said clamping rings for axially compressing said rings, first and second clamping ring stops spaced axially from the free ends of the clamping sleeves, arranged for engagement by the other end face of the respective clamping rings, and displacement means for moving said clamping ring compressors in directions toward the clamping ring stops, thereby axially compressing the clamping rings between their released positions and their clamping positions in said annular spaces, whereby said clamping rings deform radially and thus elastically deform the clamping sleeves radially to clamp and center said sleeves on the drive spindle.

9. An apparatus as claimed in claim 8, characterized in that said displacement means comprises three pulling members spaced at equal radial distance from the axis of rotation and equal angular distances from each other, passing through respective openings in the head-drum.

10. An apparatus as claimed in claim 5, characterized in that the head-drum has at least one first conical cavity on its first side and at least one second conical cavity on its second each cavity having an inner wall which forms part of a cone whose base faces the respective first and second side said elastically deformable wall portions are disposed between the bore of the head-drum and said cavities, said wall-deforming devices are clamping plugs having outer walls which engage the inner walls of the cavities, and said at least one component comprises displacement means for moving said clamping plugs toward each other.

11. An apparatus as claimed in claim 10, characterized in that said first and second conical cavities are interconnected by said opening extending from the first side to the second side, said displacement means comprises a screw-threaded draw-bolt disposed axially in said opening, and one of said clamping plugs has an internal screw-thread engaged by said draw-bolt.

12. An apparatus as claimed in claim 11, characterized in that the other of said clamping plug constitutes the head of the draw-bolt.

13. An apparatus as claimed in claim 5, characterized in that said first and second deformable wall portions comprise first and second elastically deformable clamping sleeves respectively, concentric with the drive spindle, each having a free end and a circumferential surface, said first and second wall-deforming devices comprise respective first and second clamping rings deformable between a release position and a clamping position, each ring having an uninterrupted structure in the circumferential direction so that symmetrical radial deformation exerts a local clamping pressure on the associated clamping sleeve, distributed uniformly over the circumference of the sleeve.

14. An apparatus as claimed in claim 13, characterized in that each of the clamping rings has a conical inner wall surface coaxial with said axis of rotation, through axial movement in opposite directions over the associated clamping sleeves said clamping rings, by engagement with the outer circumferential surfaces of the clamping sleeves, being expanded from their released positions to their clamping positions.

15. An apparatus as claimed in claim 14, characterized in that said head-drum has a plurality of said openings extending from the first side to the second, equally spaced and arranged to permit passage of a tool therethrough, for movement of the second clamping ring toward the first clamping ring.

16. An apparatus as claimed in claim 14, wherein said clamping ring conical surfaces have apex angles smaller than the friction angle between the materials used for the clamping sleeves and clamping rings, so that frictional forces between said sleeves and rings will prevent the clamping rings from moving back to the released positions in an axial direction as a result of axial components of the clamping forces exerted on them in the clamping positions.

17. An apparatus as claimed in claim 7, characterized in that the head-drum system includes means for engagement with and movement of said second wall-deforming device, said means comprising at least one component aligned with an opening which extends from the first side to the second side of the head-drum.

* * * * *

UNITED STATES PATENT AND TRADEMARK OFFICE
CERTIFICATE OF CORRECTION

PATENT NO. : 4,395,745
DATED : July 26, 1983
INVENTOR(S) : PETRUS J.J. AARTS ET AL It is certified that error appears in the above—identified patent and that said Letters Patent is hereby corrected as shown below:

Col. 14, line 29, "electrically" should be changed to --elastically--;

Col. 16, line 2, after "its second" insert --side,--

Signed and Sealed this

Eighteenth Day of September 1984

[SEAL]

Attest:

GERALD J. MOSSINGHOFF

Attesting Officer

Commissioner of Patents and Trademarks